(12) United States Patent
Chang et al.

(10) Patent No.: US 7,533,085 B2
(45) Date of Patent: May 12, 2009

(54) METHOD FOR SEARCHING DEEP WEB SERVICES

(75) Inventors: Yuan-chi Chang, Bayside, NY (US); Lipyeow Lim, North White Plains, NY (US); Min Wang, Cortlandt Manor, NY (US); Zhen Zhang, Champaign, IL (US)

(73) Assignee: International Business Machines Corporation, Armonk, NY (US)

( * ) Notice: Subject to any disclaimer, the term of this patent is extended or adjusted under 35 U.S.C. 154(b) by 241 days.

(21) Appl. No.: 11/503,754

(22) Filed: Aug. 14, 2006

(65) Prior Publication Data

US 2008/0040327 A1    Feb. 14, 2008

(51) Int. Cl.
    *G06F 17/30* (2006.01)
(52) U.S. Cl. .......................................... 707/3
(58) Field of Classification Search ............ 707/3, 707/101
    See application file for complete search history.

(56) References Cited

U.S. PATENT DOCUMENTS

2003/0078915 A1* 4/2003 Chaudhuri et al. ............. 707/3
2004/0024790 A1* 2/2004 Everett ........................ 707/200
2005/0050023 A1* 3/2005 Gosse et al. .................... 707/3
2005/0278368 A1* 12/2005 Benedikt et al. ............ 707/101

OTHER PUBLICATIONS

Kevin Chen-Chuan Chang, Bin He, Chengkai Li, Mitesh Patel, Zhen Zhang, Structured Databases on the Web: Observations and Implications, Computer Science Department, University of Illinois at Urbana-Champaign, SIGMOD Record 33(3): 61-70 (2004).
Wikipedia, Deep web, website: http://en.wikipedia.org/wiki/Deep_Web.

* cited by examiner

*Primary Examiner*—Don Wong
*Assistant Examiner*—Kim T Nguyen
(74) *Attorney, Agent, or Firm*—Scully, Scott, Murphy & Presser, P.C.; Lisa M. Yamonaco

(57) ABSTRACT

A method for searching deep web services is provided. The method in one aspect allows organizing communities, sources and schema attributes in a multi-tier containment relationship; searching representative schema attributes in one or more communities; searching representative services in one or more communities; searching for related schema attributes; and searching for related communities.

1 Claim, 3 Drawing Sheets

FIG. 1
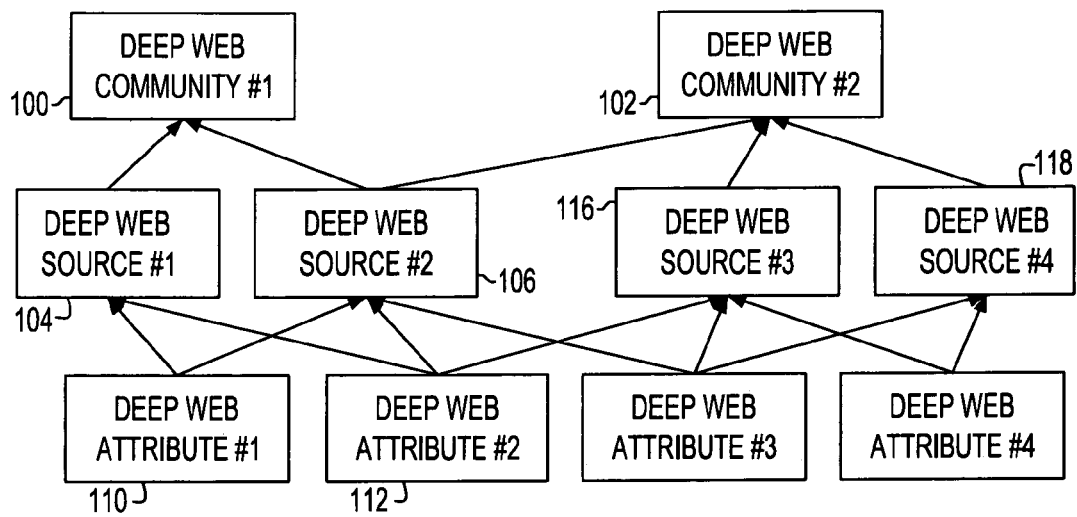
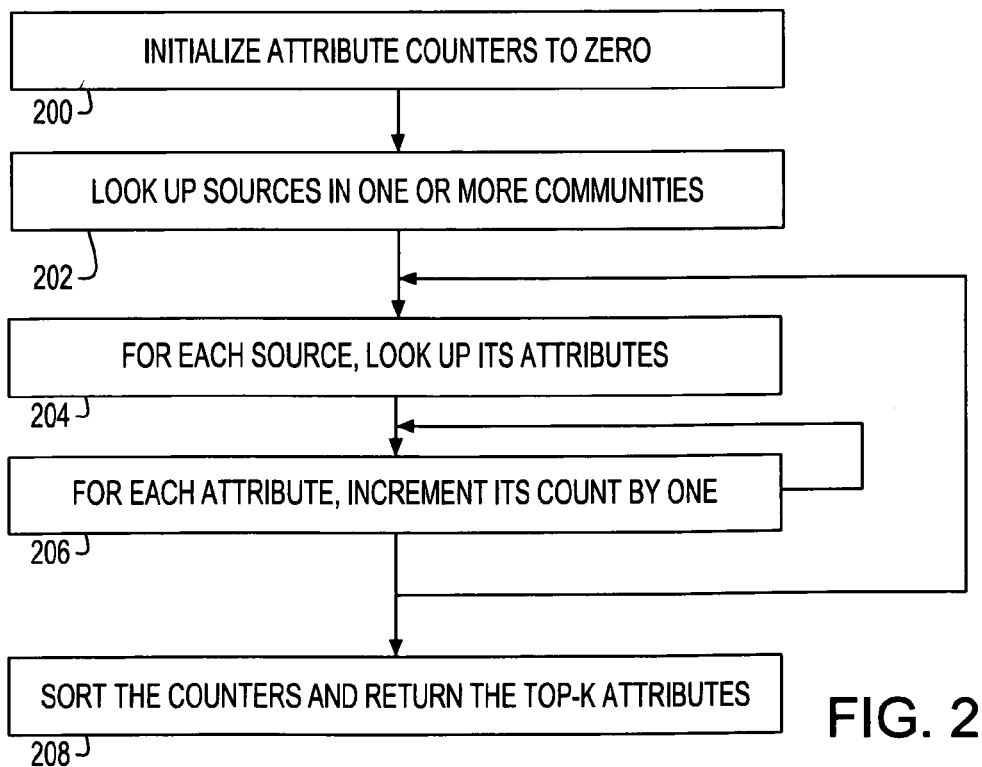
FIG. 2

METHOD FOR SEARCHING DEEP WEB SERVICES

FIELD OF THE INVENTION

The present disclosure relates to searching and exploring deep web services or databases on the World Wide Web (web). More specifically, it relates to the application of metadata (or schema attributes) used to invoke and query deep web services and search methods to associate deep web services, their schema attributes and the communities to which they belong.

BACKGROUND OF THE INVENTION

Deep web describes web sites, which offer dynamically generated web pages in response to an end-user submitted query. For example, US Postal Service (USPS) offers shipment tracking on the web by allowing end-users to submit tracking numbers. The tracking number is processed by looking up its entry in the USPS database for the time and location of the referenced shipment. Similarly, at the Hertz web site, an end-user can submit a query for a specific date, location and car model to check the availability of vehicles for rent. This information is also composed of query results of the Hertz database. Both USPS and Hertz offer deep web services, in addition to statically linked web pages for generic informational content.

It has been observed that deep web services are increasingly being offered to allow business activities and commerce transactions on the web. A common theme is that they use web forms for users to fill and submit formatted queries. As in the previous examples, USPS asks for tracking number while Hertz asks for date, location and vehicle category. Unlike static web pages, these web forms make it very difficult for search engine robots to crawl the backend databases. Since search engines do not find deep web content, deep web sometimes is referred to as the hidden web.

As deep web services proliferate, it becomes critical to understand, organize and search them.

BRIEF SUMMARY OF THE INVENTION

A method for searching deep web services is provided. In one aspect, the method provide for exploring the relationships between deep web communities, sources and schema attributes. The method of searching deep web services in one aspect includes searching a plurality of deep web service sources in one or more deep web service communities, looking-up one or more schema attributes associated with each of the plurality of deep web services sources, incrementing a count associated with each of the one or more schema attributes, and returning a predetermined K number of most frequently occurring schema attributes based on the count associated with each of the one or more schema attributes. In one aspect, the method may take as input either a source or a community. If the input is a source, the method finds the community that the source belongs to and performs the search.

The method may enable a user such as a software developer to find representative deep web services.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 1 is a graphical illustration of the organization of deep web communities, sources and their schema attributes in one embodiment of the present disclosure.

FIG. 2 is a flow diagram illustrating a method of searching for representative schema attributes in a service community in one embodiment of the present disclosure.

DETAILED DESCRIPTION

Figure 3:
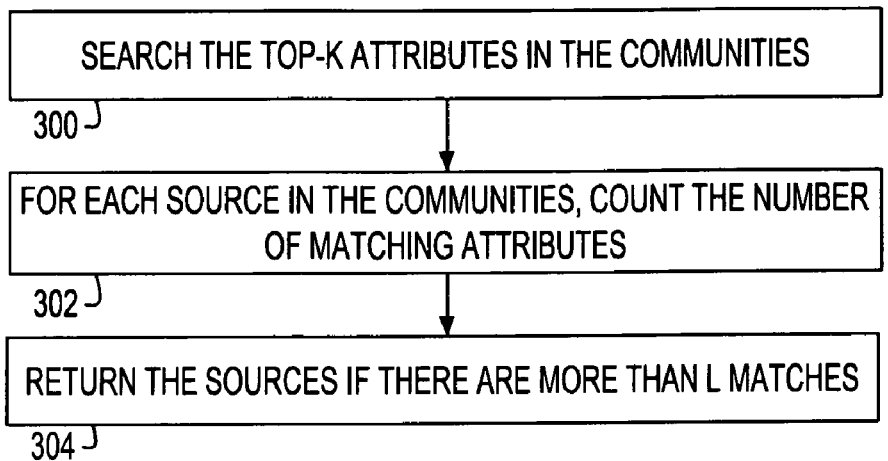
FIG. 3 is a flow diagram illustrating a method of searching for representative services in a service community in one embodiment of the present disclosure.

One or more search methods applicable to deep web services are provided. The methods of the present disclosure in an exemplary embodiment take advantage of co-occurrence of metadata or schema attributes in the web forms. It is to be appreciated that the term "deep web service" as used herein is intended to include any dynamic web pages that are invoked by filling some or all fields and by clicking the submit button on the page. Typically, a business or individual web site can contain one or more such dynamic web pages. An end-user is interested in providing the information requested on the web form in order to gain access to the backend database or information sources. An example is the airline flight status page, in which a user enters the flight number and retrieves the flight status.

The term "deep web service community" as used herein is intended to describe a group of deep web services, which may be formed by manual selection, or automated data mining process as described in the co-pending application entitled A Method and Apparatus for Organizing Data Sources assigned to the same assignee Ser. No. 11/503,713 filed on Aug. 14, 2006. The term "deep web service source" as used herein describes a single dynamic web page or web form. The terms "schema attribute" or "schema metadata" refer to the semantic definition of a field on the web form. The actual attribute values are entered by users of the form. For example, flight number is a schema attribute while AA31, UA54, DL42 are valid values for this attribute.

FIG. 1 illustrates the organization and relationships among communities, sources, and attributes in one embodiment of the present disclosure. FIG. 1 illustrates two communities (100) and (102). A community (100) contains two sources (104) and (106). A containment relationship is illustrated by an arrow (108) pointing from (104) to (100). A source (104) has two attributes (110) and (112). Similarly, another containment relationship is illustrated by an arrow (114) pointing from (110) to (104). The same source can fall in one or more communities due to different grouping criteria that are user-defined and are not in the scope of this invention. For example, the source (106) belongs to two communities (100) and (102). Similarly, attributes with the same semantic meanings can be associated with multiple sources. The attribute (112) is associated with sources (104), (106) and (116).

FIG. 1 may be best understood with an example. All airline reservation services may be grouped in one community and all hotel reservation services in another community. Airline reservation services include airline web sites and online travel agencies. They typically ask for departure and arrival cities as well as dates. Hotel reservation services include hotel web sites and online travel agencies. They ask for city and check-in/check-out dates. Some services appear in both communities, since quite often both reservations are requested at the same time. Examples of shared attributes may include attributes such as dates and destination city.

The creation of the organization as illustrated in FIG. 1 is not in the scope of this invention. Rather it may be created manually or using the data mining method as described in the co-pending application entitled A Method and Apparatus for Organizing Data Sources. FIG. 2 to FIG. 5 illustrate four search methods based on the organization of deep web services. FIG. 2 illustrates a method of searching for representative attributes in one or more communities in one embodiment of the present disclosure. Step 200 resets all attributes' counts to zero. Steps 202, 204 and 206 iterate over every source in the communities and increment counts of the attributes found. At 202, sources in one or more communities are searched. At 204, attributes for each source are searched. At 206, for each attribute, its count is incremented. Step 208 returns the K most appeared (also most shared) attributes. In one embodiment, the value K may be predetermined, for example, user defined based on specific cases.

FIG. 3 illustrates a method of searching for representative sources in a community in one embodiment of the present disclosure. Step (300) is the same as in FIG. 2 to identify the K most appeared attributes. Step (302) counts the number of matched attributes for a source. If more than L matches were found, step (304) returns the source. Those returned sources are representative because their web forms apply the most commonly used attributes in the community. In one embodiment, the value L may be predetermined, for example, user defined based on specific cases.

Figure 4:
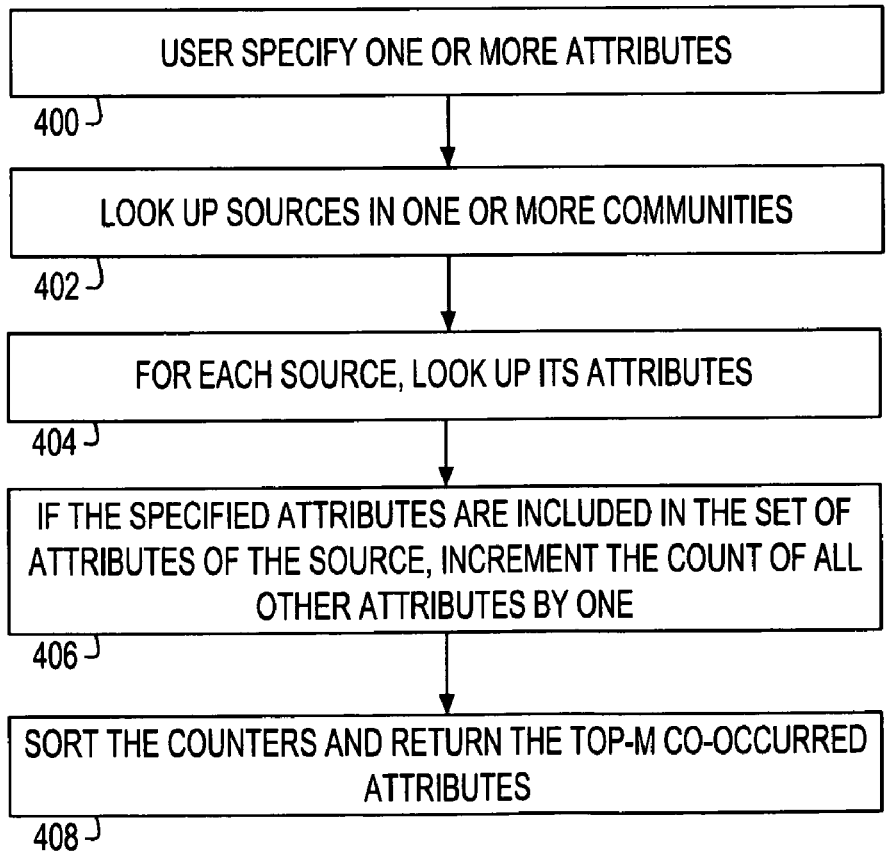
FIG. 4 is a flow diagram illustrating a method of searching for related schema attributes in one embodiment of the present disclosure.

FIG. 4 illustrates a method of searching for related schema attributes in one embodiment of the present disclosure. For example, title, author and ISBN often appear together. Given user specified attributes (400), sources are iterated (402) to check if the specified ones appear (404). If they do, the rest of the attributes unspecified are recorded (406). In the end, the K most frequently appeared attributes occurring with the user specified attributes are returned. Such occurrences suggest affinity among attributes that are used to execute a web service task. At 400, a user specifies one or more attributes. At 402, sources in one or more communities are searched. At 404, for each source, its attributes are determined. At 406, if the specified attributes are found in the set of attributes, increment the count of all other attributes appearing in the source. At 408, the M most frequently co-occurred attributes are returned. The value of M may be a predetermined, for instance, user defined value.

Figure 5:
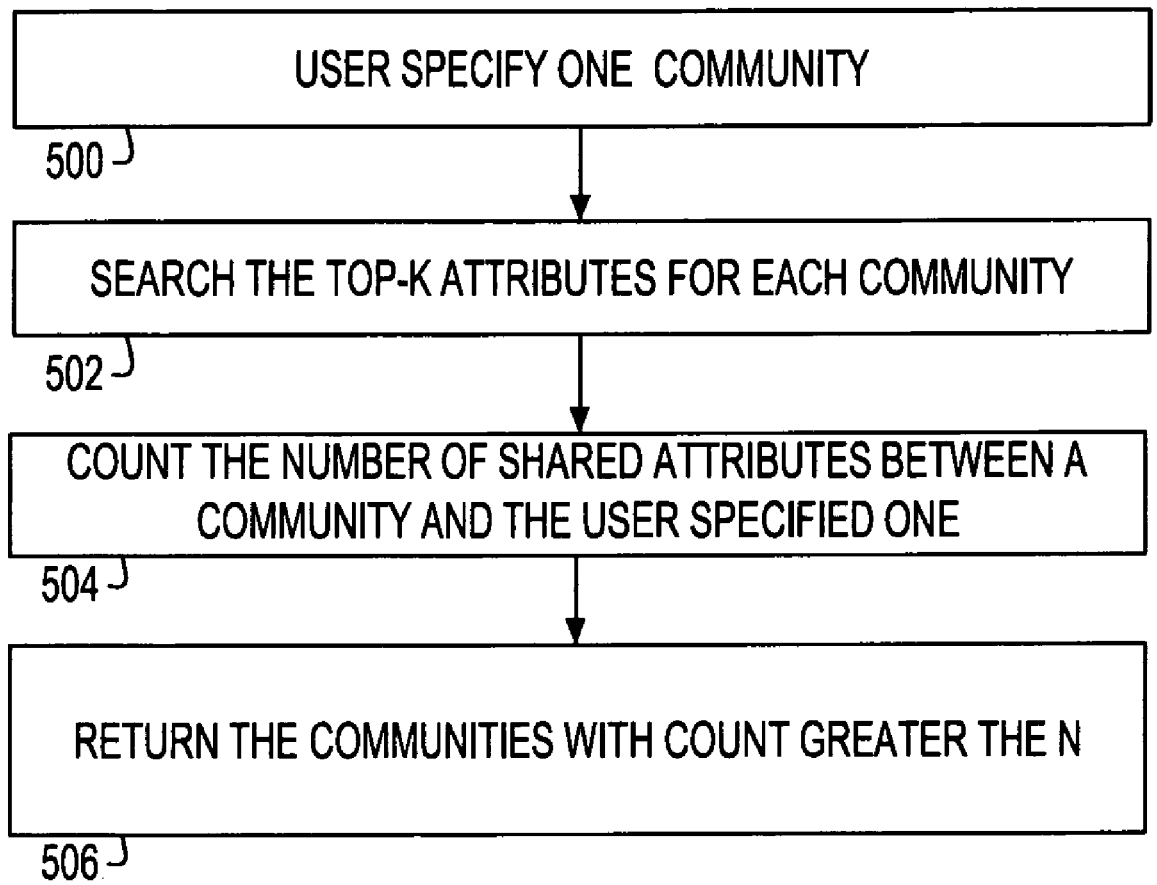
FIG. 5 is a flow diagram illustrating a method of searching for related service communities in one embodiment of the present disclosure.

Similarly, one may measure affinity among communities by counting the number of shared attributes. FIG. 5 is a flow diagram illustrating a method of searching for related service communities in one embodiment of the present. At 500, user specifies a community. At 502, the K most frequently occurring attributes are searched for each community. At 504, the number of representative attributes (502) that are shared between the user-specified community and the searched community is determined. If the count is greater than L, the two communities may be treated as being strongly affiliated and one or more communities from the searched communicates with count greater than N is returned at 506. The value of N may be a predetermined, for instance, user defined value.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" as may be used in the present application may include a variety of combinations of fixed and/or portable computer hardware, software, peripherals, and storage devices. The computer system may include a plurality of individual components that are networked or otherwise linked to perform collaboratively, or may include one or more standalone components. The hardware and software components of the computer system of the present application may include and may be included within fixed and portable devices such as desktop, laptop, and server.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A computer-implemented method of searching deep web services, comprising:

searching a plurality of deep web service sources in one or more deep web service communities;

looking-up one or more schema attributes associated with each of the plurality of deep web services sources;

incrementing a count associated with each of the one or more schema attributes;

returning a predetermined K number of most frequently occurring schema attributes based on the count associated with each of the one or more schema attributes;

receiving at least one of a source and a community as an input for searching, and if the input is a source, finding a deep web service community to which the source belongs and the step of searching includes searching a plurality of deep web service sources in the deep web service commumty;

searching for the predetermined K number of most frequently occurring schema attributes in a plurality of deep web service sources in one or more deep web service communities;

determining for each of the plurality of deep web service sources, a number of occurrences of the predetermined K number of most frequently occurring schema attributes;

returning one or more deep web service sources that are determined to have more than a predetermined L number of occurrences of one or more of the predetermined K number of most frequently occurring schema attributes;

receiving at least one of an attribute and keyword as an input for searching;

finding a deep web service community to which the attribute or the keyword belongs, and the step of searching for the predetermined K number of most frequently occurring schema attributes includes searching for the predetermined K number of most frequently occurring schema attributes in a plurality of deep web service sources in the deep web service community;

receiving a source as an input for searching;

finding a deep web service community to which the source, the attribute, or the keyword belongs;

receiving a user specified schema attribute;

if the user specified schema attribute is found in a set of schema attributes associated with each of the plurality of deep web service sources, incrementing one or more co-occurrence counts associated with one or more schema attributes in the set;

returning a predetermined M number of most frequently occurring co-occurred attributes based on the one or more co-occurrence counts;

receiving a user specified community;

for each deep web service community, determining a count of schema attributes matching one or more schema attributes in the user specified community;

returning one or more deep web service community having greater than a predetermined N number of matching schema attributes;

receiving a user specified source;

for each deep web service source, determining a count of schema attributes matching one or more schema attributes in the user specified source; and returning one or more deep web service source having greater than a predetermined N number of matching schema attributes.

* * * * *